United States Patent Office 3,702,832
Patented Nov. 14, 1972

3,702,832
PYROLYTIC CARBON FIBER
Igor Nikolaevich Ermolenko, Remma Nikolaevna Sviridova, and Zoya Ivanovna Kuvaeva, Minsk, U.S.S.R., assignors to Institut Obschei i Neorganicheskoi khimii Akademii, Nauk BSSR, Minsk, U.S.S.R.
No Drawing. Filed Apr. 8, 1969, Ser. No. 814,457
Int. Cl. C01b 31/08
U.S. Cl. 252—423
9 Claims

ABSTRACT OF THE DISCLOSURE

Pyrolytic carbon fiber containing cation-exchange acid residues, such as sulphonic, carboxylic and phosphate groups, and a method for the production of pyrolytic carbon fiber which comprises subjecting an organic fibrous material to pyrolysis, followed by sulphonating, oxidizing or phosphorylating the resultant pyrolytic fiber.

---

This invention relates to carbon or graphite fibers and, more particularly, to pyrolytic carbon fiber and to methods of producing same.

Pyrolytic carbon fiber may find application as an ion-exchange sorbent for the extraction of cations, metal ions inclusive, or traces thereof from solutions or melts, for the separation of cation mixtures, and for the removal of cation admixtures from liquids of solutions, and should, therefore, be useful in those fields of sorption technique in which recourse is had to known cation-exchange fibrous materials, as well in the fields where it is common practice to employ granular sulphonated coal or other cation exchangers.

It is likewise conceivable to use pyrolytic carbon fiber as a component of diverse compositions, e.g. in filled plastics.

Pyrolytic carbon fiber produced by the pyrolysis of diverse polymeric organic fibers, predominantly cellulose fibers is known in the art.

Also known are various polymeric organic fibers containing diverse functional groups capable of participating in ion-exchange processes, viz, cellulose phosphate, carboxymethyl cellulose or oxidized cellulose fibers, etc.

Further known in the art are chemically modified coals, e.g. sulphonated coals or oxidized coals.

The known pyrolytic carbon fiber is devoid of cation-exchange properties and, hence, is unsuitable for use on an industrial or laboratory scale as a cation-exchange sorbent.

The known cation-exchange organic fibers exhibit inadequate chemical and thermal resistance and cannot, therefore, be effectively used under heavy duty conditions, which fact precludes the accomplishment of a variety of industrially important processes involving the sorption of cations from corrosive media, hot solutions or melts.

On the other hand, modified coals containing cation-exchange groups do not lend themselves to employment in sorption processes which call for the use of fibrous materials, such as cloth filters, bands, etc. When used for carrying out sorption processes, modified coals necessitate additionally treating the solutions, after the sorption step, to remove the fine coal grains entrained therewith.

It is an object of the present invention to eliminate the aforesaid disadvantages.

It is a further and more specific object of the present invention to provide pyrolytic carbon fiber which will be noted for its cation-exchange properties and will display high chemical and thermal resistance.

These objects have been accomplished by the provision of pyrolytic carbon fiber which contains, according to the present invention, cation-exchange acid groups, viz sulphonic, carboxylic or phosphate groups.

The present cation-exchange carbon fiber can be prepared by a method comprising subjecting organic fiber to pyrolysis, followed, according to the invention, by sulphonating, oxidizing or phosphorylating the resultant carbon fiber.

In order to enhance the mechanical strength of the carbon fiber obtained by the pyrolytic technique and also to increase the yield of the carbon fiber it is expedient to oxidize or esterify the organic fiber, e.g., cellulose fiber, prior to pyrolysis.

Where it is desired to impart to the pyrolytic carbon fiber, which contains cation-exchange acid residues, additional properties, such as electrical conductivity and catalytic properties, it is good practice to treat the cellulose fiber stock, prior to pyrolysis, but after cellulose fiber oxidation of esterification, with solutions of metal salts. This treatment results in incorporating into the composition of the fiber, metals linked directly to the fiber matrix.

The method of producing pyrolytic carbon fiber having cation-exchange properties is accomplished in the following manner.

Polymeric organic fiber, e.g., polyacrylonitrile fiber, cellulose fiber or cellulose-derivative fiber, is subjected to pyrolysis in vacuum or in an inert atmosphere. The organic fiber yields, on being pyrolyzed, carbon fiber which is washed with water and thereafter, on heating, treated with for example, concentrated sulphuric acid or oleum in case it is desired to sulphonate the carbon fiber. To incorporate carboxylic groups, the carbon fiber should be oxidized, nitric acid being a convenient oxidizing agent.

The incorporation of phosphoric acid residues into carbon fiber is effected by subjecting the carbon fiber to phosphorylation with such agents as phosphoric acid or phosphorus trichloride. Phosphorus trichloride should be used in the presence of anhydrous aluminum chloride.

The employment of phosphorus trichloride yields phosphorylated carbon fiber in which phosphorus atoms are linked directly to carbon atoms in the fiber matrix (C—P bonds), whereas with phosphoric acid as the phosphorylating agent the resultant phosphorylated carbon fiber contains phosphoric acid residues in which phosphorus atoms are linked to carbon atoms of the fiber matrix via oxygen atoms (C—O—P bonds).

With a view to enchancing the strength of carbon fiber obtained as a result of the pyrolytic process and also to increasing the yield of the pyrolytic carbon fiber it is preferable that organic fiber stock, viz, cellulose fiber, be subjected, prior to pyrolysis, to oxidation with, say, nitrogen dioxide or to esterification with, say, phosphoric acid.

Where it is desired to impart to the pyrolytic carbon fiber containing cation-exchange acid residues additional desirable properties, such as electrical conductivity, catalytic activity, etc., it is good practice to use solutions of metal salts, e.g. aluminum sulphate solution, to impregnate the oxidized or esterified fiber prior to subjecting said fiber to pyrolysis.

A study of conditions for regenerating the present pyrolytic carbon fiber has shown the fiber to be readily converted into the hydrogen form and to be similar in this respect to cation-exchange granulated coals, e.g. oxidized coals.

Exchange capacity of the carbon fiber obtained by the present method is adequately high and exceeds 5 mg. equiv./g., which exchange capacity correspond to that of diverse prior art polymeric ion exchangers.

The present carbon fiber may be used in the form of yarn, fabric, or bands, an added advantage being that the aforesaid goods may be fabricated from the present fiber at any stage of accomplishing the method of the invention, for example, prior to the pyrolysis step, after the pyrolysis step, or after a chemical modification step.

For a better understanding of the invention, presented hereinbelow by way of illustration are the following examples of producing the pyrolytic carbon fiber having cation-exchange properties.

EXAMPLE 1

Cellulose fiber in the form of linen fabric is washed with hot distilled water to remove the sizing agent and thereafter oxidized with nitrogen dioxide at room temperature for a period of 5 days.

The oxidized product containing 11.2% by weight of COOH-groups, as determined by the calcium acetate method, is washed with distilled water until the washings show a neutral reaction and thereafter dried in the air.

The oxidized cellulose fiber (in the form of fabric) is then treated with a 0.1 M solution of aluminum sulphate to convert the carboxylic groups into the aluminum carboxylate groups, the degree of conversion being 90%. Next the fiber is dried and subjected to pyrolysis by maintaining it under vacuum ($10^{-3}$ mm. of mercury) and gradually raising the temperature to 500° C. at a rate of 4–5° per minute. The volatile products of pyrolysis are retained in a liquid nitrogen trap.

The resultant pyrolytic carbon fiber (carbon cloth) containing aluminum is sulphonated by treating it with concentrated sulphuric acid (sp. gr. 1.84) at a temperature of 160–180° C. for a period of 3 hours, the liquor ratio being 1:100.

The sulphonated carbon fiber is washed with distilled water until the washings show a neutral reaction and then dried at a temperature of 105° C.

The sodium-exchange capacity of the thus obtained cation-exchange fiber containing sulphonic-acid groups equals 2.5 mg. equiv./g.

To determine heat resistance characteristics, the finished carbon fiber is heated in the absence of air at a temperature of 300° C. for a period of 1 hour. After the aforesaid heat treatment, the exchange capacity of the carbon fiber shows no detectable diminution, but heating the fiber at 400° C. for 1 hour causes the exchange capacity to drop to 40% of its initial value.

EXAMPLE 2

Cellulose fiber in the form of rayon yarn is oxidized at room temperature with nitrogen dioxide until the content of COOH-groups in the fiber equals 12%, followed by treating the oxidized fiber with a 0.1 M solution of aluminum sulphate to convert 90% of the carboxylic groups present into the aluminum carboxylate groups. Next the fiber is dried and subjected to pyrolysis by maintaining the fiber under vacuum ($10^{-3}$ mm. of mercury) and gradually raising the temperature 550° C. at a rate of 4–5° per minute.

The resultant pyrolytic carbon fiber (yarn) is treated with concentrated sulphuric acid (sp. gr. 1.84) at a temperature of 106–180° C. for a period of 3 hours, the liquor ratio being 1:100, followed by washing the sulphonated fiber with distilled water until the washings show a neutral reaction and drying the fiber in the air at 105° C.

The exchange capacity of the finished fiber equals 2.5 mg. equiv./g. and remains constant after treating the fiber within 1 N solutions of NaOH, HCl or $H_2SO_4$.

The tensile strength of the fiber prior to and after the sulphonation step equals 21.2 kg./mm.$^2$ and 21.4 kg./mm.$^2$, respectively.

The finished fiber is insoluble in organic solvents.

EXAMPLE 3

Cellulose fiber in the form of rayon yarn is subjected to oxidation, treated with a solution of aluminum sulphate and thereafter pyrolyzed by following the procedure of Example 2.

The resultant pyrolytic carbon fiber (yarn) is treated with concentrated (70%) nitric acid for a period of 1 hour, while heating the reaction mixture on a water bath, followed by washing the fiber with distilled water until the washings show a neutral reaction and air drying the fiber.

The sodium exchange capacity of the finished fiber is 2 mg. equiv./g.

The finished fiber exhibits a tensile strength of 9.2 kg./mm.$^2$ and is inferior in this respect to the sulphonated fiber of Example 2, but nevertheless retains its fibrous texture.

EXAMPLE 4

Cellulose fiber in the form of rayon yarn is oxidized with nitrogen dioxide at room temperature until the content of COOH-groups in the fiber equals 12%, followed by pyrolysing the oxidized fiber under vacuum ($10^{-3}$ mm. of mercury) by gradually raising the temperature to 500° C. at a rate of 4° per minute.

The resultant pyrolytic carbon fiber (yarn) is treated with sulphuric acid as disclosed in Example 2.

The exchange capacity of the finished sulphonated carbon fiber equals 3 mg. equiv./g. and is not affected by treating the fiber with a 1 N solution of NaOH, HCl or $H_2SO_4$.

EXAMPLE 5

Cellulose fiber in the form of linen fabric is treated with nitrogen dioxide at room temperature until the content of COOH-groups in the fiber equals 12% by weight, followed by washing the fiber with distilled water and drying in the air.

The oxidized cellulose fiber (fabric) is impregnated with a 0.1 M solution of aluminum sulphate and washed with distilled water until the washings contain no aluminium ions. Next the fiber (aluminum salt of oxidized cellulose) is subjected to pyrolysis under vacuum ($10^{-3}$ mm. of mercury) by gradually raising the temperature up to 500° C. at a rate of 4° per minute.

The resultant pyrolytic carbon fiber is extracted with an ethanol-ether mixture to remove soluble pyrolysis products and thereafter treated with orthophosphoric acid (sp. gr. 1.7) at a temperature of 200–220° for a period of 2 hours, the liquor ratio being 1:100.

The phosphorylated carbon fiber thus obtained is washed with distilled water until the washings show a neutral reaction and dried in the air.

The exchange capacity of the finished fiber equals 2.5 mg. equiv./g.

EXAMPLE 6

Cellulose fiber in the form of linen fabric is subjected to oxidation and pyrolysis in accordance with the procedure of Example 5, followed by treating the resultant carbon fiber with phosphorus trichloride in the presence of anhydrous aluminum chloride (the $PCl_3$-to-$AlCl_3$ ratio is 2:1) at a temperature of 70–75° C. for a period of 10 hours, washing the phosphorylated fiber with distilled water until the washings show a neutral reaction and thereafter treating the fiber with 25% nitric acid at a temperature of 60° C. for a period of 8 hours, and washing it thrice with 1 N solutions of sodium hydroxide and hydrochloric acid. Next the fiber is washed with distilled water until the washings show a neutral reaction and thereafter subjected to air drying.

The finished phosphorylated carbon fiber has an exchange capacity of 4.5 mg. equiv./g.

EXAMPLE 7

Cellulose fiber in the form of linen fabric is subjected to pyrolysis under vacuum ($10^{-4}$ mm. of mercury) by raising gradually the temperature to 500° C. at a rate of 4° per minute.

The pyrolytic carbon fiber (fabric) thus obtained is treated with concentrated sulphric acid (sp. gr. 1.84) at a temperature of 160–180° C. for a period of 3 hours, the liquor ratio being 1:100. The sulphonated carbon fiber is then washed with distilled water until the washings show a neutral reaction and dried in the air at a temperaure of 105° C.

The sodium-exchange capacity of the resultant sulphonated carbon fiber equals 3 mg. equiv./g.

EXAMPLE 8

Cellulose fiber in the form of linen fabric is subjected to pyrolysis under vacuum and thereafter sulphonated as described in Example 7.

The sulphonated carbon fiber has a sodium-exchange capacity of 2.8 mg. equiv./g.

EXAMPLE 9

Cellulose fiber in the form of rayon yarn is subjected to pyrolysis under vacuum ($10^{-4}$ mm. of mercury) by gradually raising the temperature up to 500° C. at a rate of 4° per minute.

The resultant pyrolytic carbon fiber is treated with concentrated phosphoric acid as disclosed in Example 5.

The phosphorylated carbon fiber has an exchange capacity of 2.2 mg. equiv./g.

EXAMPLE 10

Cellulose fiber in the form of linen fabric is subjected to pyrolysis under vacuum ($10^{-4}$ mm. of mercury) by gradually raising the temperature up to 500° C. at a rate of 4° per minute.

The resultant pyrolytic carbon fiber (fabric) is treated with concentrated (70%) nitric acid on a water bath for a period of 1 hour, followed by washing the fiber with distilled water until the washings, show a neutral reaction and dried in the air.

The finished fiber has an exchange capacity of 1.5 mg. equiv./g.

EXAMPLE 11

Cellulose fiber in the form of cotton cloth (coarse calico) is treated at a room temperature and for a period of 30 minutes with an aqueous solution of orthophosphoric acid and urea taken in a proportion of 1 mole/l. and 4 moles/l., respectively, the liquor ratio being 1:10. Then the fiber is wrung out until the weight of the treated fiber is twice as great as that of the starting dry fiber, dried in the air at 60° C. and thereafter dried in a vacuum drier evacuated by a primary vacuum pump, the temperature in the drier being gradually raised to 140° C.

Heat treatment at this temperature proceeds for 30 minutes, followed by washing the fiber with hot and cold water until the washings show a neutral reaction, and drying the fiber.

The content of bound phosphorus in the orthophosphoric ester of cellulose thus prepared equals 3.5%.

The fiber is subjected to pyrolysis under vacuum ($10^{-4}$ mm. of mercury) by gradually raising the temperature to 500° C. at a rate of 4° per minute, followed by sulphonating the resultant carbon fiber as disclosed in Example 7.

The finished cation-exchange fiber containing sulphonic-acid groups has an exchange capacity of 1.2 mg. equiv./g.

EXAMPLE 12

Cellulose fiber in the form of cotton cloth (coarse calico) is phosphorylated and subjected to pyrolysis by following the procedure of Example 11.

The resultant pyrolytic carbon fiber is treated with concentrated orthophosphoric acid (sp. gr. 1.7) at a temperature of 200–220° for a period of 2 hours, the liquor ratio being 1:100.

The phosphorylated carbon fiber is then washed with distilled water until the washings show a neutral reaction, and dried in the air.

The finished phosphorylated fiber has a sodium-exchange capacity of 1.5 mg. equiv./g.

EXAMPLE 13

Polyacrylonitrile fiber is subjected to pyrolysis under vacuum ($10^{-4}$ mm. of mercury) by gradually raising the temperature to 600° C. at a rate of 4° per minute.

The resultant pyrolytic carbon fiber is treated with concentrated sulphuric acid (sp. gr. 1.84) at a temperature of 160–180° C. for a period of 3 hours, the liquor ratio being 1:100.

The sulphonated carbon fiber is washed with distilled water until the washings show a neutral reaction and dried in the air at a temperature of 105° C.

The finished cation-exchange carbon fiber has an exchange capacity of 1.3 mg. equiv./g.

We claim:

1. Carbon ion-exchange pyrolytic fiber containing cation-exchange acid residues in its chemical composition, said acid residues being selected from the group consisting of sulphonic, carboxylic and phosphate groups.

2. A method of producing pyrolytic ion-exchange carbon fiber which comprises subjecting an organic fiber to pyrolysis and reacting the same upon heating with a member of the group consisting of sulfuric, nitric, and phosphoric acids, thereby incorporating into the resulting pyrolytic carbon fiber acid residues selected from the group consisting of sulphonic, carboxylic and phosphate groups.

3. A method according to claim 2, wherein the pyrolytic carbon fiber is sulphonated by treatment with concentrated sulfuric acid upon heating, thereby incorporating sulphonic groups thereinto.

4. A method according to claim 2, wherein said organic fiber is oxidized cellulose fiber, and wherein the oxidized fiber is treated by impregnation with an aqueous aluminum salt solution prior to pyrolysis.

5. A method according to claim 2, wherein said organic fiber is cellulose phosphate fiber, and wherein the esterified fiber is treated by impregnation with an aqueous aluminum salt solution prior to pyrolysis.

6. A method of producing pyrolytic carbon fiber which comprises subjecting an organic fiber to pyrolysis and incorporating upon heating carboxylic groups into the resulting pyrolytic carbon fiber by treatment with concentrated nitric acid.

7. A method of producing pyrolytic carbon fiber which comprises subjecting an organic fiber to pyrolysis and incorporating phosphate groups upon heating into the resulting pyrolytic carbon fiber by treatment with phosphoric acid.

8. A method of producing pyrolytic ion-exchange carbon fiber which comprises subjecting an organic fiber to pyrolysis and reacting the same upon heating with a member of the group consisting of sulphuric, nitric, and phosphoric acids, thereby incorporating into the resulting pyrolytic carbon fiber acid residues selected from the group consisting of sulphonic, carboxylic and phosphate groups, said organic fiber being oxidized cellulose fiber.

9. A method of producing pyrolytic ion-exchange carbon fiber which comprises subjecting an organic fiber to pyrolysis and reacting the same upon heating with a member of the group consisting of sulphuric, nitric, and phosphoric acids, thereby incorporating into the resulting pyrolytic carbon fiber acid residues selected from the group consisting of sulphonic, carboxylic and phosphate groups, said organic fiber being cellulose phosphate fiber.

References Cited

UNITED STATES PATENTS

| 1,060,065 | 4/1913 | Cottrell | 252—421 |
| 1,873,410 | 8/1932 | Horak | 252—421 |
| 2,106,257 | 1/1938 | Schwartz | 252—422 |
| 2,191,063 | 2/1940 | Smit | 252—422 X |
| 3,053,775 | 9/1962 | Abbott | 252—421 |
| 3,304,148 | 2/1967 | Gallagher | 252—421 X |
| 3,479,299 | 11/1969 | Rivin et al. | 252—426 |
| 3,479,300 | 11/1969 | Rivin et al. | 252—426 X |

PATRICK P. GARVIN, Primary Examiner

U.S. Cl. X.R.

252—421, 422, 431 C, 437, 439